July 17, 1962

R. I. N. WEINGART 3,045,068

APPARATUS FOR THE RETENTION OF EVIDENCE
OF TELEPHONE CONVERSATIONS

Filed March 25, 1957

INVENTOR.
RICHARD I. N. WEINGART
BY
ATTORNEYS 3,045,068
APPARATUS FOR THE RETENTION OF EVIDENCE OF TELEPHONE CONVERSATIONS
Richard I. N. Weingart, New York, N.Y. (% General Register Corporation, 43—01 22nd St., Long Island City, N.Y.)
Filed Mar. 25, 1957, Ser. No. 648,157
5 Claims. (Cl. 179—6)

This invention relates to a method and apparatus for handling business transactions and has particular reference to the handling of credit transactions such as may be involved in betting, stock or commodity transactions, purchases and sales on credit, or the like.

The invention is particularly applicable to legalized betting at race tracks and will be particularly described in that application, though, as will become evident hereafter, the invention may be utilized in the handling of other credit transactions to avoid errors, giving full protection to both parties involved.

It is common at race tracks to tolerate a betting service, particularly to patrons of boxes, to avoid the necessity of their purchasing or cashing tickets at the usual ticket windows. For this purpose, "runners" offer their services to receive money from betters and place the bets, delivering the tickets and thereafter cashing the same. There is, in such case, a possibility of fraud to the detriment of the track and the taxing authorities in that the runner, who may be engaged to place a bet, may place part or all of it other than at the ticket windows. Accordingly, the practice is frowned upon, but must be tolerated in deference to the wishes to the betters.

In accordance with the present invention, a would-be better may have a deposit account with the track and may place bets from a box or other local station at the track, with assurance that the transaction will be completely recorded both for the benefit of the better and the track. In accordance with the invention, a permanent record is made of each betting transaction in such fashion as to eliminate the possibility of fraud.

As will become apparent hereafter, the invention is also applicable to other credit transactions which may be most conveniently carried out by telephone. Such transactions may involve, for example, the purchase and sale of securities or commodities, the purchase of airline or railroad transportation tickets, or the like.

Figure 1:
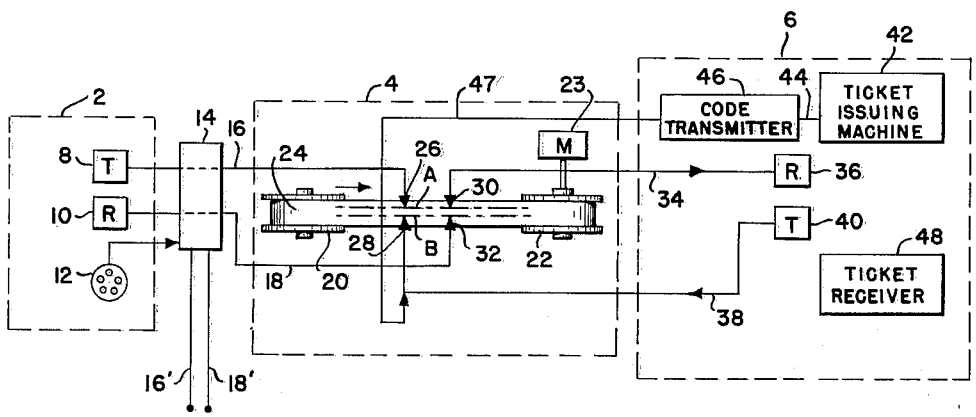
Figure 2:
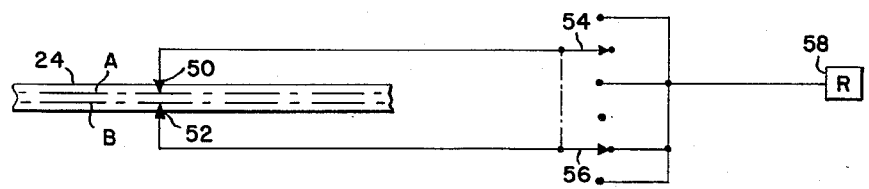

The general objects of the invention relate to the attainment of the foregoing results, and will become apparent from the following description, read in conjunction with the accompanying drawing, in which:

FIGURE 1 is a block diagram illustrating in outline a preferred type of system particularly adapted to race track betting; and FIGURE 2 is a diagram illustrative of apparatus used for the checking of records.

The equipment preferably involved may be regarded as comprising three primary zones which are indicated in FIGURE 1 respectively at 2, 4 and 6. There is indicated at 2 a better's station which may, for example, be a race track box. At 4 there is indicated a recording zone which, desirably, comprises an enclosure which is locked except to persons authorized to have access thereto. At 6 there is indicated the bet taker's zone which may consist of an enclosure within which is located a ticket issuing machine together with other devices as will be described in greater detail hereafter.

The better's zone 2 which is indicated in FIGURE 1 is merely typical of what may be a large number of such zones at a race track, for example, the boxes thereat and, if desired, other conveniently located stations from which bets may be transmitted. Each such zone comprises a telephone transmitter 8, a receiver 10, and, if desired, a dial 12. As indicated, these elements are connected to a telephone switching means 14. This switching means is indicated only diagrammatically since, as will be immediately apparent, it may comprise nothing more than a conventional telephone switching means of the type commonly used in intra-office communication, whereby through the use of a dial a transmitting station may be selectively connected to any desired number of receiving stations. In the present case, operation of a dial 12 may connect the transmitter-receiver equipment in the zone 2 selectively to any of a number of ticket issuing zones 6 which individually may be provided with ticket issuing machines adapted to issue tickets of particular denominations. The indications on the dial may be in terms of denominations of the bets to be placed. As indicated in FIGURE 1, the switching means may connect the transmitter 8 to a line 16 and the receiver 10 to a line 18, with the alternative possibility, through variable dialing, to make connections through other lines such as 16' or 18' to other ticket issuing zones. For simplicity, the diagram in FIGURE 1 is shown as involving the condition of switching such as to connect the zone 2 to the zone 6 through the intermediate zone 4 which is individually associated with the zone 6.

Located in the locked enclosure constituting zone 4 is a two-channel tape recorder and reproducer comprising the tape supply reel 20 for the tape 24 and the takeup reel 22 which is arranged to be driven at suitable speed from the motor 23 which may be caused to operate from the switching means 14 only when the dial is operated to provide connection to the associated zone 6. Two channels on the magnetic tape 24 are indicated at A and B.

Individual to these channels are the recording heads 26 and 28. Also individual to these respective chanels are the pickup heads 30 and 32 which may immediately follow the recording heads in the direction of movement of the tape so that the time lapse between recording and reproduction may be only a small fraction of a second. No erasing means is provided so that despite the fact that the signals on the chanels A and B are reproduced, the magnetic record is permanently carried to the takeup reel 22. If desired, of course, there may precede the recording heads 26 and 28 suitable erasing means to wipe out signals previously existent on the tape. This, however, may be done separately.

As indicated in FIGURE 1, the transmitter 8 is connected through line 16 to the recording head 26. The reproducing heads 32 is connected through line 18 to the receiver 10. In similar fashion, the pickup head 30 is connected through line 34 to a receiver 36 in the zone 6, and a transmitter 40 in the zone 6 is connected through line 38 with the recording head 28. The two recording heads occupy, desirably, similar positions along the length of the tape and this is also true of the reproducing heads 30 and 32.

A conventional totalizator ticket issuing machine is provided at 42 in the zone 6, and is conventionally connected to the track totalizator system so that all bets represented by tickets issued by the machine will be fed to the totalizator system as part of the betting transactions of the track, the ticket issuing machine being itself conventionally controlled so that it will issue tickets only when the bet is recorded. Since the totalizator system, as such, forms no part of the present invention, it need not be further described.

Desirably, in accordance with the present invention, the drive of the ticket issuing machine is connected through a shaft 44 to a code transmitter indicated at 46 which may consist of no more than a wheel having an array of teeth of coded type thereon capable of operating a switch to transmit through connection 47 coded signals to the recording head 28. This connection may alternatively be to the head 26 or, through the use of isolating means such as cathode followers to both heads. The code transmitter of each ticket issuing machine may provide a coded output in terms of Morse coding of a pair of letters, or the like, sufficing to identify the operation of the particular ticket issuing machine with which it is associated. More elaborately, the code transmitter may transmit additional data identifying the machine, the race, the contestant number, the amount, and the type of bet. Such elaboration is, however, generally unnecessary.

Desirably, in the zone 6 there may also be a ticket receiver 48 in the form of a box containing compartments or other receptacles identified as to betters and in which the bet taking attendant in the zone 6 may place tickets which have been issued.

Preliminarily to considering the operation of placing a bet, it may be noted that the transmitter 8 may provide signals to the receiver 36 only through the medium of recording on the tape 24, and the same is true of transmission of signals from the transmitter 40 to the receiver 10. If there is any faulty operation of the tape recording and reproducing device the continuity of the signals will be interrupted with the result that either the better or the attendant will be unable to hear the other, thus giving an indication that the arrangement is not properly operating and hence incapable of properly completing the betting transaction.

In the operation of the system, the better, having made a proper deposit with the track to cover the bets which are to be made, will receive a credit card identified, for example, by a number. Both the track and the law will permit bets to be made only to the extent of the credit which exists in the better's account.

When a better desires to place a bet, he will raise the telephone receiver in conventional fashion and operate the dial 12 to correspond to the unit amount of the bet which he desires to place. This dialing through the switching means 14 will signal the appropriate attendant in a zone 6 and start the operation of the corresponding tape 24.

The attendant in the called zone 6 (of which there may be, of course, several for each denomination of bet, there being conventional automatic switching to complete a connection to a zone 6 which is not busy) may then state in effect: "Your credit card number and name, please."

The better then should give his credit card number and name and state the bet he wishes to place.

To prevent error and make a definite record the operator, or attendant should then note and repeat the credit card number, the name, and the identity and amount of the bet. The attendant will then issue the appropriate ticket or tickets. As each ticket issues, the identifying code of the machine is transmitted through the transmitter 46 and recorded on the tape in the form of dots and dashes arranged, for example, in Morse code. This code will be heard by the better and will indicate to him that a ticket is issued.

Following this the operator should then read from the ticket or tickets the face identification stating, for example, "Please note your ticket number is 53852 and the time is 4:11."

The ticket may then be marked to identify the better and time and placed in a folder or compartment at 48 which is marked with the credit card number and name of the better.

The resulting charge or credit is then, in due course, posted to the account of the better, and a statement may be sent to the better, checks being sent to him to cover winnings in excess of the requirer deposit.

It will be now evident that there is a complete check on the transaction involved if any question arises. The tapes such as 24 should be retained intact for any necessary time. The statement of time by the operator will serve to identify a particular betting transaction so that it may be readily found on the tape in case of question. If there is some question about the bet either by the better or the track, the tape may be run through a reproducing apparatus of the type illustrated in FIGURE 2 wherein the tape is illustrated as being run past a pair of reproducing heads 50 and 52 picking up signals from the respective channels A and B. Through a double-pole triple-throw switching arrangement 54, 56, connected to a receiver 58 the channels A and B may be either individually read or simulaneously read, the switch arms in the upper position reading the channel A, in intermediate position the channel B, and in lower position both channels A and B simultaneously, the latter giving a complete picture of the telephone interchange between the better and the attendant. Arrangement is desirably made for the separate reading of the channels so that confusion arising from simultaneous statements of both parties may be resolved to determine which of the parties was at any time speaking. Through this type of analysis of the record on the tape, any arguments about a transaction may be resolved.

It may be noted that the system as outlined above is proof against the profiting by anyone from a false statement of a card number since any checks for winnings would go only to the owner of the credit. The agreement of the track with the better will, of course, be such as to relieve the track of liability to the better for the charging against him of a bet falsely placed by some one else.

It will be now evident that the invention is applicable to other transactions carried out by telephone on a credit basis. For example, a broker's office may be provided with equipment of the type indicated so that a transaction involving the sale or punches of stocks or other commodities can only be completed through the medium of recording on a tape followed by reproduction to complete the connections between the parties involved. Similarly, credit sales of tickets or reservations for transportation may be recorded for checking in case of disputes.

What is claimed is:

1. Apparatus for the retention of evidence of a two-way telephone conversation comprising a pair of spaced zones interconnected by a telephone communication system, said system including a transmitter and receiver in each zone for use by a person therein, and a recorder, said recorder comprising means providing a pair of recording channels, a recording means receiving signals from the transmitter in one zone to record such signals on one of said recording channels, a pickup means for picking up such recorded signals immediately following the recording thereof and transmitting them to the receiver in the other zone, a second recording means receiving signals from the transmitter in the second zone to record such signals on the other of said recording channels, and a second pickup means for picking up the last mentioned recorded signals immediately following the recording thereof and transmitting them to the receiver in the first zone, the arrangement being such that signals from the transmitter in each of said zones may be transmitted to the receiver in the other of said zones only by way of recording on and subsequent pickup from the respective recording channels, said recorder being of a type providing a permanent recording of said recorded signals and maintaining a fixed relationship of the signals in said channels relative to each other.

2. Apparatus according to claim 1 in which said recorder comprises a tape on which said recording channels extend side by side lengthwise of the tape.

3. Apparatus for the retention of evidence of business transactions carried out by a two-way telephone conversation comprising a pair of spaced zones interconnected by a two-way telephone communication system, a ticket issuing machine in one of said zones, means for permanently recording signals transmitted in both directions by said communication system, and means controlled by operation of the ticket issuing machine to effect recording by said recording means of signals indicative of each operation of the ticket issuing machine.

4. Apparatus for the retention of evidence of a two-way telephone conversation comprising a pair of spaced zones interconnected by a two-way telephone communication system, said system including a transmitter and receiver in each zone for use by a person therein, and means for permanently recording simultaneously in individual channels moving in fixed relationship to each other signals transmitted in both directions by said communication system thereby to maintain the time sequence of the signals transmitted in the respective directions, said system including means for interrupting communication through said system in the event of failure of the last mentioned means to record said signals.

5. Apparatus for the retention of evidence of a two-way telephone conversation comprising a pair of spaced zones interconnected by a telephone communication system, said system including a transmitter and receiver in each zone for use by a person therein, and a recorder, said recorder comprising means providing a pair of recording channels, a recording means receiving signals from the transmitter in one zone to record such signals on one of said recording channels, a pickup means for picking up such recorded signals immediately following the recording thereof and transmitting them to the receiver in the other zone, a second recording means receiving signals from the transmitter in the second zone to record such signals on the other of said recording channels, and a second pickup means for picking up the last mentioned recorded signals immediately following the recording thereof and transmitting them to the receiver in the first zone, the arrangement being such that signals from the transmitter in each of said zones may be transmitted to the receiver in the other of said zones only by way of recording on and subsequent pickup from the respective recording channels, said recorder being of a type providing a permanent recording of said recorded signals and maintaining a fixed relationship of the signals in said channels relative to each other, a ticket issuing machine in one of said zones, and means controlled by operation of the ticket issuing machine to record signals on one of said recording channels each time said ticket issuing machine is operated.

References Cited in the file of this patent
UNITED STATES PATENTS

| | | |
|---|---|---|
| Re. 24,170 | Lee | June 26, 1956 |
| 2,115,803 | Dudley | May 3, 1938 |
| 2,224,244 | Hicks | Dec. 10, 1940 |
| 2,327,956 | Begun | Aug. 24, 1943 |
| 2,539,139 | Jordanoff | Jan. 23, 1951 |
| 2,561,338 | Camras | July 24, 1951 |
| 2,660,621 | Billar | Nov. 24, 1953 |